United States Patent
Knutson

[11] 3,897,847
[45] Aug. 5, 1975

[54] TRACTOR FRONT END CONSTRUCTION
[75] Inventor: Roger Eric Knutson, Waterloo, Iowa
[73] Assignee: Deere & Company, Moline, Ill.
[22] Filed: June 26, 1972
[21] Appl. No.: 266,209

[52] U.S. Cl. ............ 180/68 R; 180/69 R; 280/5 A
[51] Int. Cl. ............................................. B60k 11/04
[58] Field of Search ........ 280/5 A; 180/54 A, 68 R, 180/69 R, 54 D; 293/69 R

[56] References Cited
UNITED STATES PATENTS

| | | | |
|---|---|---|---|
| 1,629,493 | 5/1927 | Ford | 280/5 A |
| 2,254,359 | 9/1941 | Frudden et al. | 280/5 A |
| 2,549,524 | 4/1951 | Rich | 180/54 D X |
| 2,758,845 | 8/1956 | Doyle et al. | 280/5 A |
| 2,764,449 | 9/1956 | Dunham | 280/5 A X |
| 2,866,510 | 12/1958 | Flamm | 293/69 R X |
| 2,871,967 | 2/1959 | Du Shane | 280/5 A X |
| 2,875,840 | 3/1959 | Klemm | 180/54 A |
| 2,952,328 | 9/1960 | Steiner | 180/69 R |
| 3,067,829 | 12/1962 | Klemm | 180/69 R X |
| 3,270,462 | 9/1966 | Obadal et al. | 180/69 R UX |
| 3,297,080 | 1/1967 | Williams et al. | 293/69 R |
| 3,394,772 | 7/1968 | Abold | 280/5 A X |
| 3,512,795 | 5/1970 | Naeve | 280/5 A |
| 3,565,203 | 2/1971 | Ashton et al. | 180/68 R |
| 3,671,070 | 6/1972 | Johnson et al. | 280/5 A X |

*Primary Examiner*—David Schonberg
*Assistant Examiner*—David M. Mitchell

[57] ABSTRACT

A tractor has a fore-and-aft engine with a pair of main frame members extending forwardly from opposite sides of the engine. A front frame member interconnects the forward ends of the fore-and-aft frame members at the forward end of the tractor and a fuel tank is mounted on the front frame member and includes a generally upright front wall extending upwardly from and generally flush with the front side of the front frame member and a pair of side walls generally coplanar with the fore-and-aft frame members. The fuel tank has a rear wall spaced forwardly from the radiator, which is disposed immediately in front of the engine. The fuel tank also includes an upper part overhanging the rear wall, and the tractor hood covers the engine and the upper part of the fuel tank, the front of the hood, the front wall of the fuel tank, and the front of the forward frame member forming the front of the tractor. A pair of perforated, removable side panels extend rearwardly between the fuel tank side walls and the radiator on opposite sides of the tractor below the hood to form an enclosed compartment between the fuel tank and the radiator, in which a tractor air cleaner, oil cooler, and air conditioning condenser are mounted, the radiator fan drawing the air through the side panels, the oil cooler, and the condenser before it passes through the radiator.

11 Claims, 5 Drawing Figures

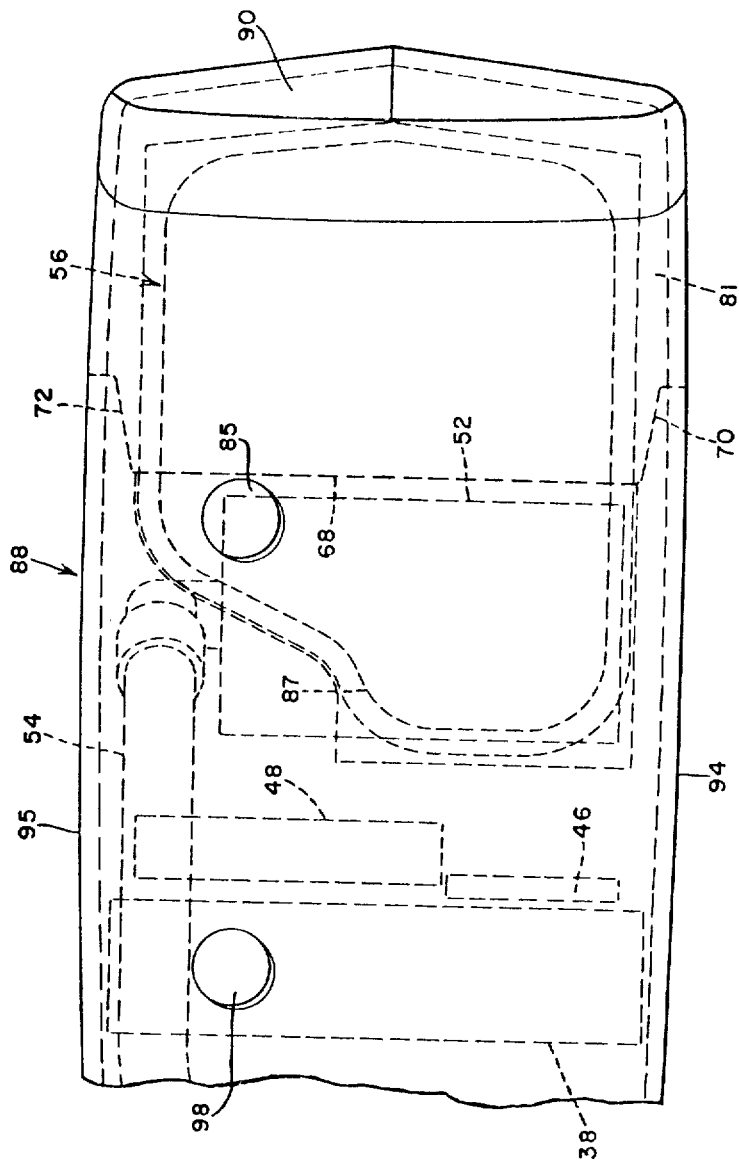

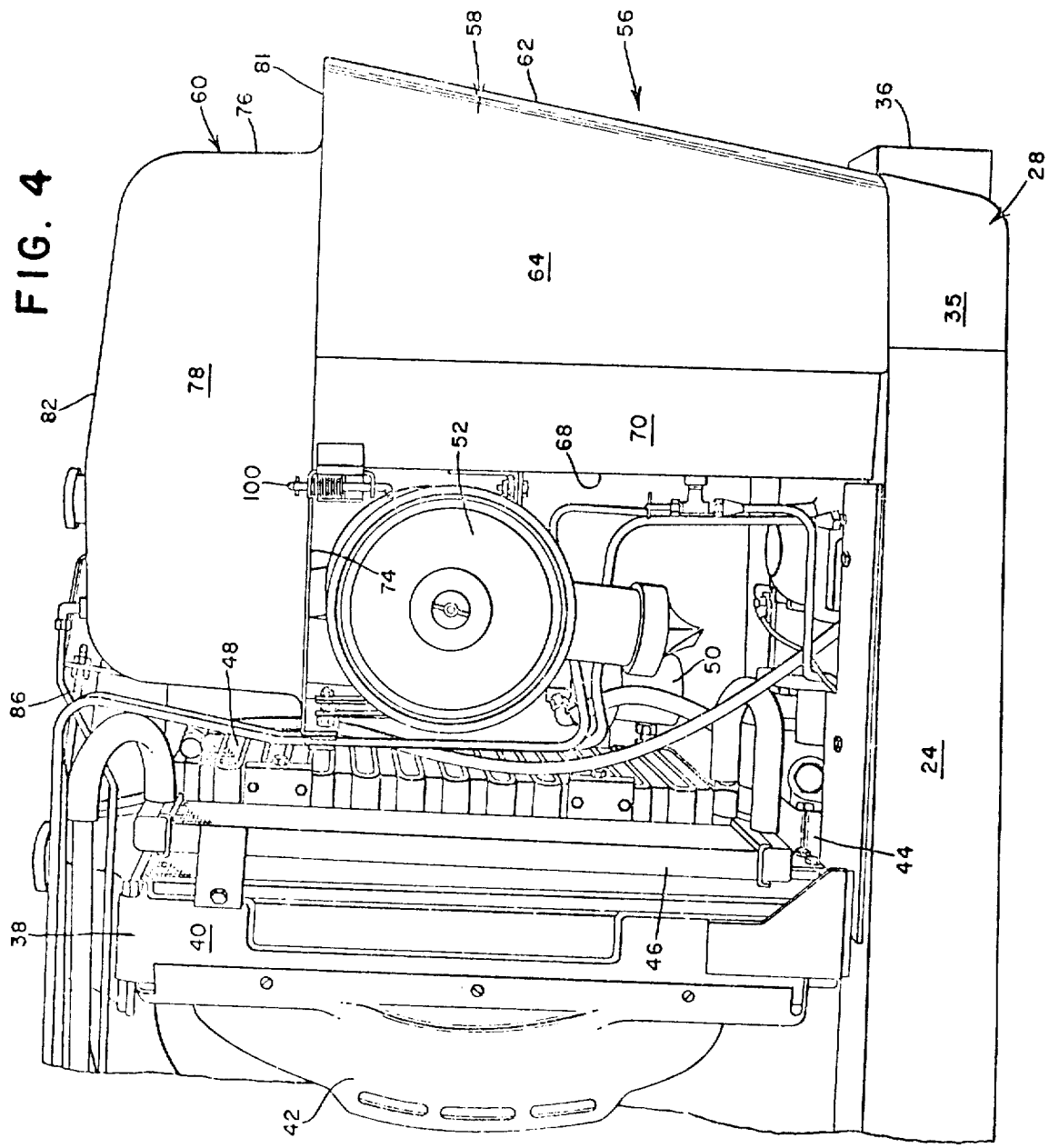

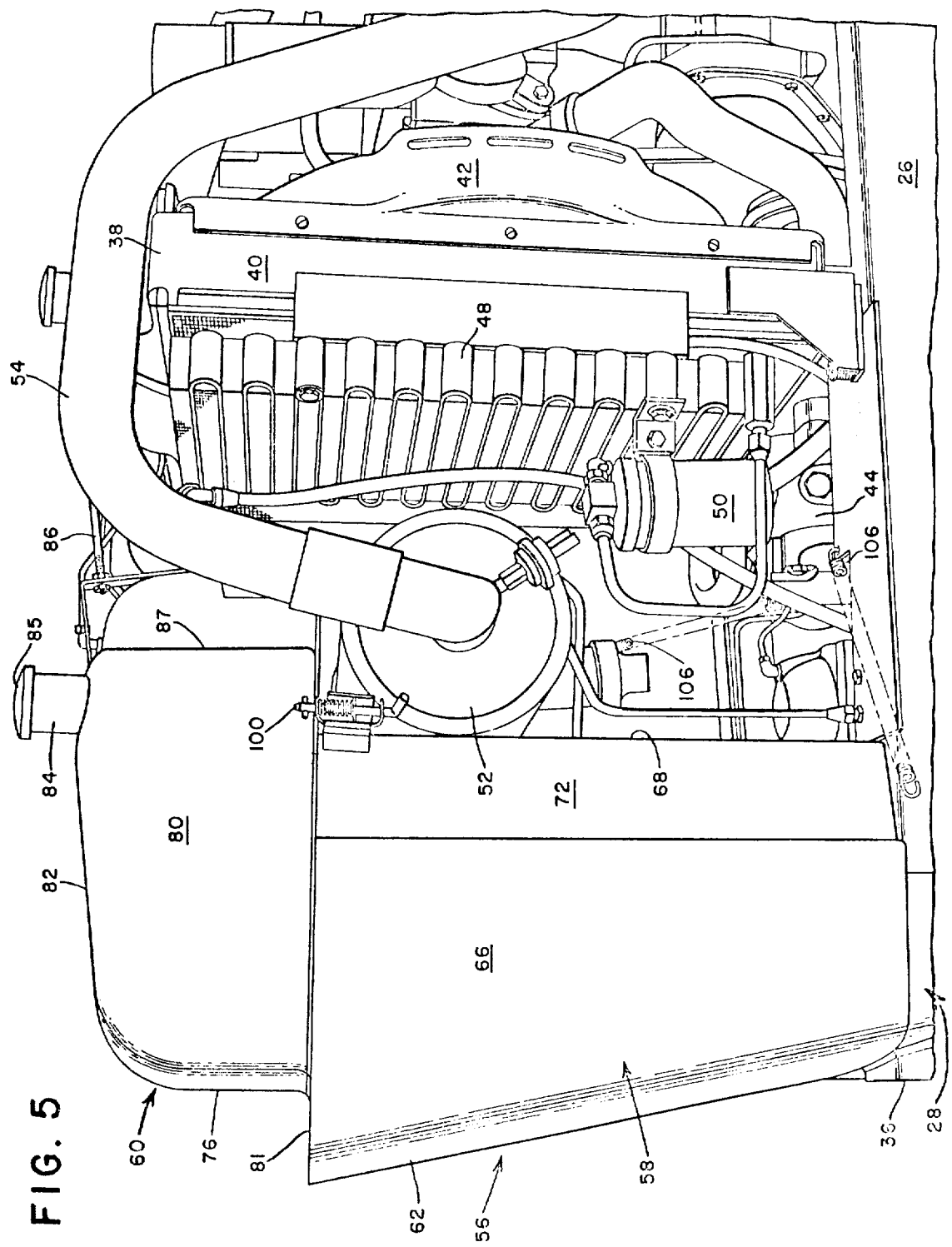

TRACTOR FRONT END CONSTRUCTION

BACKGROUND OF THE INVENTION

This invention relates to the construction of an agricultural or industrial tractor or the like, and more particularly to the construction and arrangement of components at the front end of such a tractor.

Agricultural and relatively small industrial tractors have conventionally utilized a fore-and-aft main frame with a pair of rear drive wheels and steerable front wheels, the operator's station conventionally being centrally located and elevated between the rear wheels behind a fore-and-aft internal combustion engine. To provide adequate visibility for the operator, the width of the tractor in front of the operator's station is maintained as narrow as possible, and the height of the hood is maintained as low as possible. This, of course, reduces the space available for such components as the fuel tank, the air cleaner, the radiator, and the oil cooler. Also, many larger tractors are now provided with cabs, which further limits the space available in the area of the operator's station, and, when the cabs are provided with air conditioning, space is also required for the air conditioning condenser, which, heretofore, has generally been mounted in the cab roof.

It is known to mount the fuel tank adjacent the front end of the tractor forwardly of an upright transverse radiator immediately in front of the engine, as shown in U.S. Pat. No. 2,871,967, issued 3 Feb. 1959 to DuShane and also assigned to the assignee herein. It is also known to mount the oil cooler and air cleaner in the space between the fuel tank and radiator, the air being drawn through perforated side panels behind the fuel tank and through the radiator by a fan behind the radiator, as described in said patent. However, heretofore, in such an arrangement, a wrap-around shield structure has been provided in front of the fuel tank to protect the fuel tank while presenting an attractive front end for the tractor, the front of the hood being supported on top of the shield structure.

SUMMARY OF THE INVENTION

According to the present invention, there is provided an improved construction of the front of the tractor, which provides a compact, efficient, economical, and attractive arrangement of components.

An important feature of the invention resides in the placement of the fuel tank at the front end of the tractor without any shielding in front of the fuel tank, the front wall and portions of the side walls of the fuel tank being styled to form part of the front of the tractor.

Another important feature of the invention resides in the provision of a two-part fuel tank, with the exposed front and side walls of the fuel tank being formed in the lower tank part, while the upper tank part is offset inwardly and to the rear of the lower part and is covered by the tractor hood. Also according to the invention, a shelf or shoulder is provided between the two fuel tank parts and on which the front end of the hood is supported. Also, according to the invention, the fuel tank is arranged to provide for maximum capacity in the space allotted.

Still another feature of the invention resides in the disposition of the air conditioning condenser together with the oil cooler and air cleaner in a compartment between the rear wall of the fuel tank and the radiator. Also, removable perforated side panels are provided to close the opposite sides of said compartment, the air being drawn and filtered through the side panels before it passes through the oil cooler, air conditioning condenser, and radiator.

BRIEF DESCRIPTION OF THE DRAWINGS

FIG. 3 is a plan view of the front end of the tractor.

FIG. 4 is a right side perspective view showing the same portion of the tractor as FIG. 2, but with the hood and side panels removed to expose some of the tractor components.

FIG. 5 is a left side perspective view of the front end of the tractor, also with the side panels and hood removed.

DESCRIPTION OF THE PREFERRED EMBODIMENT

Figure 1:
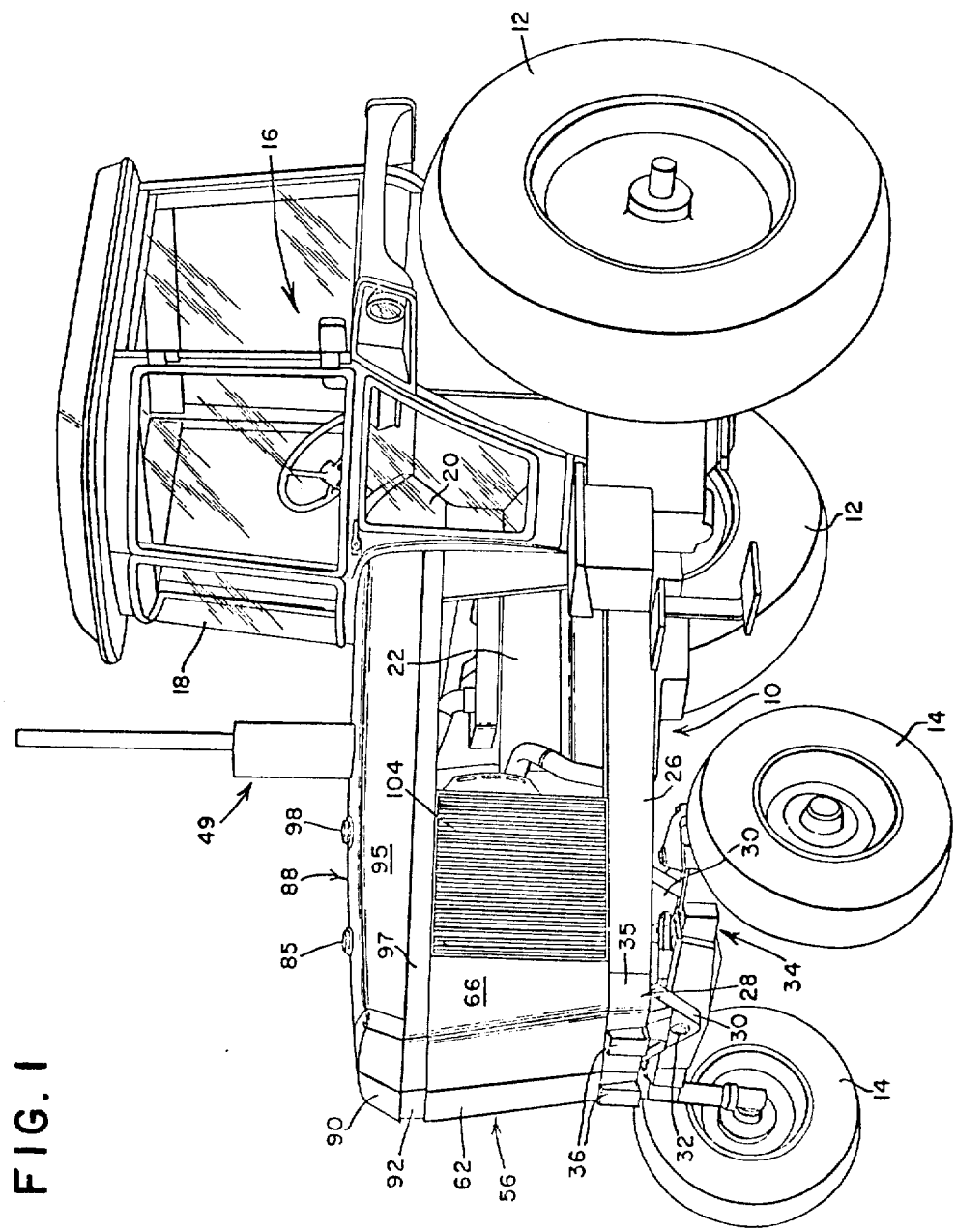
FIG. 1 is a left front perspective view of a tractor embodying the improved front end design.

The invention is embodied in an agricultural tractor having a fore-and-aft main frame or body, indicated in its entirety by the numeral 10 and mounted on a pair of rear drive wheels 12 and steerable front wheels 14. An operator's station 16 is disposed on the fore-and-aft centerline of the tractor between the rear drive wheels 12 and generally above the tractor transmission (not shown). The operator's station includes a cab 18, the front wall of which fits around an inverted U-shaped cowling 20 at the front of the operator's station. A fore-and-aft engine 22 is mounted on the main frame 10 on the fore-and-aft centerline of the tractor immediately in front of the operator's station, the operator being disposed generally above the level of the engine so that he overlooks the engine. As is apparent, the cab 18 is also provided with windows which permit visibility along either side of the engine, so that the operator is able to see immediately in front of the tractor.

All of the above represents more-or-less conventional tractor construction. As is also well known, the main frame includes a pair of fore-and-aft frame members 24 and 26 respectively connected to and extending forwardly from the opposite sides of the engine 22. The frame members have channel-shaped cross sections with outer, upright bight portions, and the front ends of the frame members 24 and 26 are rigidly interconnected by a large, transversely extending frame member or casting 28. The member 28 includes a pair of depending transverse brackets 30 which carry a fore-and-aft pivot 32, on which a front axle structure 34 is rockably mounted to permit oscillation of the front axle structure 34. The front frame member or casting 28 includes opposite sides 35, which are respectively flush with the side frame members 24 and 26, and a pair of upright pads 36 on its front surface, to which front weights are removably attachable in the conventional manner.

A generally rectangular, upright transversely oriented radiator 38 for the engine 22 is mounted on the main frame immediately in front of the engine 22 and has opposite, lateral, upright sides 40 extending generally upwardly from the opposite side frame members 24 and 26. A fan housing 42 is mounted on the rearward side of the radiator 38, and includes a rearward circular opening in which a conventional fan (not shown) rotates to draw air rearwardly through the radiator core in a conventional fashion.

A hydraulic pump 44 is mounted on the forward end of the engine 22 and extends forwardly under the radiator 38, and a generally rectangular, upright, transverse oil cooler 46 is mounted on the forward side of the radiator 38 adjacent to the right side. As is usually the case, the cab 18 is air conditioned, and a generally rectangular, upright, transverse air conditioner condenser 48 is mounted on the front of the radiator 38 adjacent the left side of the radiator. As is apparent, the oil cooler 46 and condenser 48 extend substantially the entire height of the radiator and are mounted side-by-side at the front of the radiator, so that air passing through the radiator first passes through the oil cooler and the condenser. The air conditioning system also includes a receiver-dryer 50 which is mounted on the front side of the condenser 48. An axially transverse cannister-type air cleaner 52 is mounted immediately in front of the oil cooler and condenser and provides clean air for the engine 22 through an outlet hose 54, which extends up over the left side of the radiator back to the engine.

A fuel tank, indicated in its entirety by the numeral 56, is mounted on top of the front frame member 28 and includes a lower part 58 and an upper part 60. The lower part has a generally upright front wall 62, which forms part of the front end of the tractor. As is apparent, the front wall 62 is inclined upwardly and slightly forwardly and forms a continuation of the front of the front frame member or casting 28. The front wall also has a slight break on the centerline of the tractor so that the opposite sides of the front wall taper slightly to the rear. The lower part 58 of the fuel tank also has right and left side walls 64 and 66, which respectively extend rearwardly from the opposite sides of the front wall, the right and left front corners of the fuel tank being rounded to provide an attractive appearance. The rearward ends of the side walls 64 and 66 are connected by an upright transverse rear wall 68, and the right and left side walls 64 and 66 are respectively provided with upright, rectangular recesses 70 and 72, which extend the height of the lower fuel tank part 58 adjacent to the rear wall 68. As is apparent, the recesses 70 and 72 are offset slightly inwardly from the outer side of the side frame members 24 and 26, while the remainder of the side walls 64 and 66 are coplanar with and form an upper extension from the outer surfaces of the frame members 24 and 26 and the opposite sides 35 of the front frame member.

The upper part 60 of the fuel tank 56 is mounted on the top of the lower part 58 and overhangs the rear wall 68. The upper part includes a bottom 74 extending rearwardly from the upper end of the rear wall 68, a front wall 76 offset slightly to the rear of the lower part front wall 62, and right and left side walls 78 and 80 respectively, which are offset slightly inwardly from the right and left side walls 64 and 66 of the lower part 58. The offset of the front and side walls of the upper part from the front and side walls of the lower part forms a U-shaped shoulder or shelf 81 on top of the lower fuel tank part 58. The corners of the upper part are rounded, and the upper part also includes a somewhat rounded top 82 having a vertically extending filler neck 84 covered by a removable cap 85.

The fuel tank 56 is attached to the front frame member 28 aand is also supported by an anchor bolt 86, which rigidly connects the upper fuel tank part 60 to the upper end of the radiator 38. As is apparent, the upper fuel tank part 60 overlies the air cleaner 52 which is mounted on and immediately to the rear of the rear wall 68, and the upper fuel tank part 60 includes a rear wall 87 which angles forwardly at the left side of the fuel tank to provide clearance for the air cleaner outlet hose 54.

A fore-and-aft elongated hood 88 overlies the fuel tank, the engine, and the components therebetween forwardly of the front of the cab, the rear end of the hood being immediately in front of the cowling 20 and in front of the front windshield of the cab. As is apparent, the hood is relatively shallow and thus does not cover the sides of the engine. The hood 88 includes a front end 90 which is supported on the fuel tank shoulder or shelf 81. The front end 90 is inclined slightly upwardly and to the rear and like the front wall 62 has a vertical centerline break with a rearward taper on opposite sides of the break. As is apparent, the front end of the hood is formed to appear as a continuation of the front wall 62 of the fuel tank, although a slight horizontal recess 92 is provided along the lower edge of the hood front end 90. The hood 88 also includes right and left side walls 94 and 95 respectively, which extend the length of the hood and, like the front end 90, are relatively shallow. The side walls 94 and 95 respectively have horizontal offsets or recesses 96 and 97 along their lower edges, which form a continuation of the front recess 92. As is apparent, the recesses 96 and 97 in conjunction with the recess 92 form a styling band along the lower edge of the hood, the band being preferably of different color than the rest of the tractor and having the usual identifying indicia applied thereto.

The radiator has a conventional filler neck and cap 98, which extends through the hood like the fuel tank neck 84, and the engine exhaust pipe and muffler 49 also extend upwardly through the hood. The hood is held onto the fuel tank 56 by a pair of latches 100 on opposite sides of the fuel tank, and the hood is easily removed by releasing the latches 100 and vertically lifting the hood until it clears the exhaust pipe and muffler 49.

Figure 2:
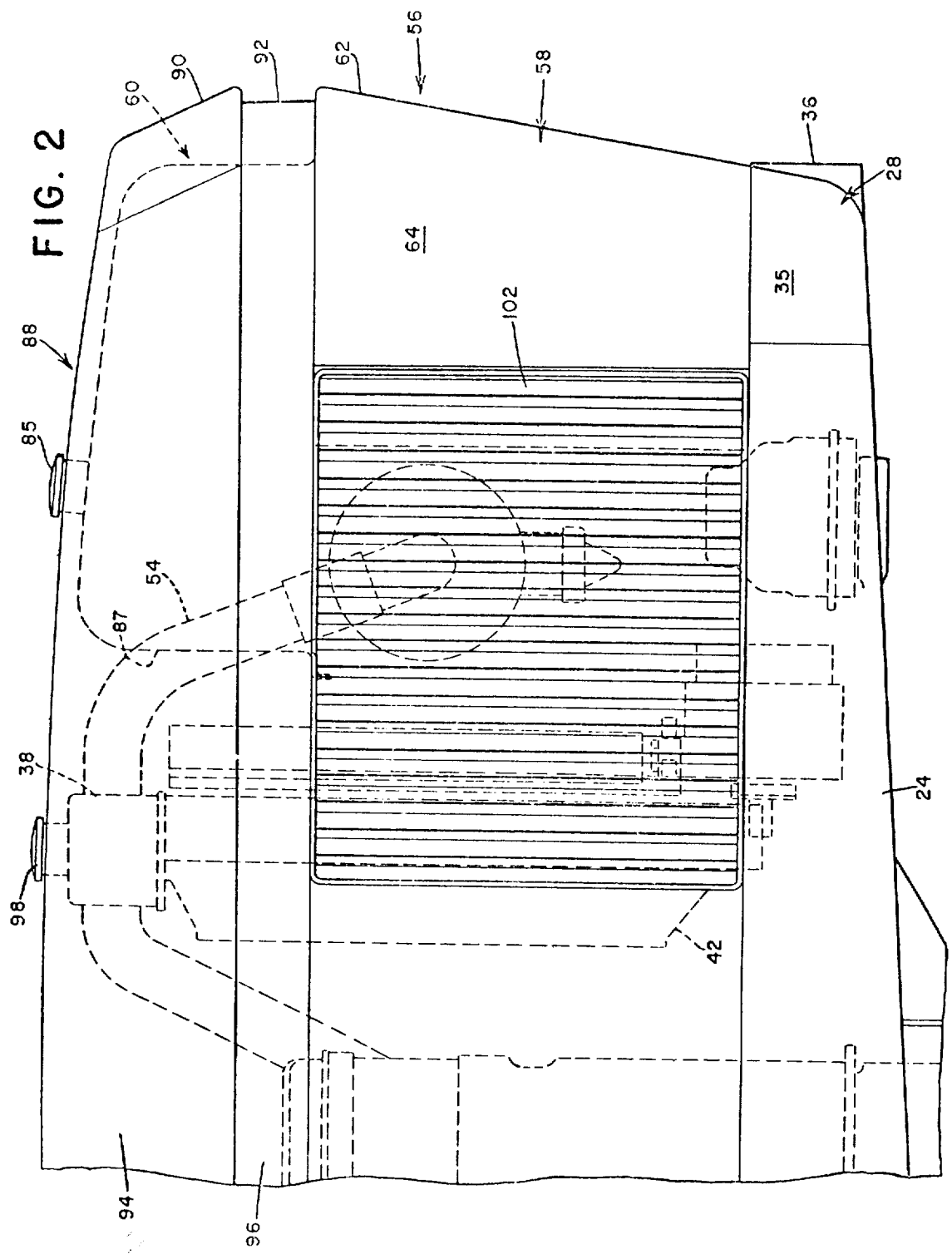
FIG. 2 is an enlarged side elevation view of the front end of the tractor body.

A pair of upright, fore-and-aft, generally rectangular side panels 102 and 104 are respectively mounted on opposite sides of the tractor between the respective lower edges of the hood and the top of the frame members 24 and 26, the side panels extending rearwardly from the lower part of the fuel tank to the opposite sides 40 of the radiator. The front ends of the side panels are received in and tightly seat against the recesses 70 and 72 in the respective side walls, so that the panels are generally flush with the outer sections of the side walls 64 and 66 as well as the outer surface of the side frame members 24 and 26, while the rear edges of the side panels seat against the opposite sides 40 of the radiator. A sealing material is preferably provided in the recesses 70 and 72 and along the radiator sides 40, so that the fan pulls air only through the side panels, which are perforated to filter the air drawn through the radiator. The side panels are also vertically corrugated, to increase the effective filtering area. Each side panel is maintained in its closed or upright position, as shown in FIGS. 1 and 2, by a tension spring 106, which extends between the approximate middle of the panel and the opposite side frame member. The springs 106 thus form an X in front of the oil cooler and condenser and below the air filter and are stretchable to permit the side panels to be swung outwardly to expose the components and the compartment between the fuel tank and the radiator. The side panels can also be totally removed by unhooking the springs from the panels, as shown in FIG. 5 which is the only view that shows the springs.

As is apparent, the fuel tank front wall 62 provides a major portion of the front end of the tractor body, and also blends in with the hood front end 90 as well as the front surface of the front frame member 28, to provide an attractive apperance. The fuel tank also supports the front end of the hood, and is also configured to provide maximum fuel tank capacity in the allotted space. Also, the engine fan provides the cooling air for the air conditioner-condenser 48, as well as the oil cooler 46 and the engine radiator 38, eliminating the need for a separate fan. Access to the components in the compartment between the fuel tank and the radiator is also easily obtained by simply swinging out side panels 102, and the hood 88 is also easily removed to provide further access to the engine and its accessories.

I claim:

1. In a vehicle having a fore-and-aft main frame with a forward end, and an engine spaced rearwardly from the forward end, the improvement comprising: a fuel tank mounted on the main frame and including a generally upright front wall extending upwardly from the forward end of the main frame and generally upright side wall sections extending rearwardly from the opposite sides of the front wall; a hood mounted on the vehicle in overlying relationship with the engine and the fuel tank and including a front end generally flush with and above the fuel tank front wall, and opposite side wall portions generally above and aligned with the fuel tank side wall sections, the forward end of the main frame, the fuel tank front wall and the forward end of the hood conjunctively forming the front of the vehicle the fuel tank including a lower part, which includes said front wall and side wall portions, and an upper part covered by said hood, the upper part being recessed rearwardly of the lower part front wall and inwardly of the lower part side walls to form a shoulder on which the hood seats; and a pair of foraminous generally upright side panels beneath and generally flush with said hood side wall portions, the fuel tank side wall sections having means adapted to receive the front ends of the side panels.

2. The invention defined in claim 1 including an upright transverse radiator immediately in front of the engine and spaced rearwardly of the fuel tank to form a compartment below the hood and between the fuel tank and radiator.

3. The invention defined in claim 2 wherein the lower part of the fuel tank includes a generally upright transverse rear wall, and the upper part extends rearwardly of the rear wall of the lower part, the overhanging rearward portion of the upper part overlying at least a portion of said compartment.

4. The invention defined in claim 2 and including an engine air cleaner and at least one heat exchanger mounted in said compartment, the engine cooling air being drawn through said side panels, the heat exchanger and the radiator.

5. In a vehicle having a fore-and-aft main frame with a forward end and an engine spaced rearwardly from the forward end, the improvement comprising: a fuel tank mounted on the main frame adjacent the forward end and including a lower part having a front wall, a rear wall and opposite side walls and an upper part on top of the lower part and extending rearwardly of and overhanging the rear wall of the lower part; an upright, transverse radiator disposed between the engine and the fuel tank, the fuel tank and radiator partially forming a compartment between the fuel tank and radiator, the overhanging portion of the upper part of the fuel tank overlying at least a portion of the compartment; and a hood overlying and substantially covering the upper part of the fuel tank and the radiator.

6. The invention defined in claim 5 wherein the upper part has a front wall disposed rearwardly of the lower part front wall, and opposite side walls disposed inwardly of the respective lower part side walls to form a shoulder on top of the lower part, a portion of the bottom edge of the hood seating against said shoulder.

7. The invention defined in claim 6 wherein the side walls of the lower part are respectively provided with vertical recesses adjacent the rear wall of the lower part and a pair of side panels are removably mounted on opposite sides of the main frame below the lower edge of the hood with their forward terminal edges respectively disposed in said recessed and forming the opposite sides of said compartment.

8. In a vehicle having a fore-and-aft main frame including a forward frame member and a pair of fore-and-aft, laterally spaced frame members extending rearwardly from opposite ends of the forward frame member and an upright transverse radiator disposed forwardly of the engine and between the fore-and-aft frame member, the improvement comprising; a fuel tank mounted on the main frame above the forward frame member and including a first part having a front wall extending upwardly from the front of the forward frame, a rear wall spaced forwardly of the radiator, and opposite side walls, at least a portion of the respective side walls extending upwardly from the respective side frame members; a hood overlying the engine and having its forward end supported on the fuel tank generally flush with the fuel tank front wall and having side walls generally flush with the fuel tank side walls; and a pair of generally upright, fore-and-aft, foraminous side panels respectively extending between the opposite side frame members and the hood and respectively having their forward ends seating against the opposite side walls of the fuel tank and their rearward ends seating against the opposite lateral sides of the radiator.

9. The invention defined in claim 8 wherein the space below the hood and between the fuel tank and the radiator and between the opposite side panels forms a substantially closed service compartment, and an air cleaner means and at least one heat exchanger means is mounted in said compartment.

10. The invention defined in claim 8 wherein the fuel tank includes a second part mounted on top of the first part and substantially covered by the hood, the second part overhanging the rear wall of the first part and at least partially overlying the air cleaner, 11. The invention defined in claim 10 wherein the second part of the fuel tank has a front wall disposed rearwardly of the first part front wall to form a shoulder between the first and second parts, and the hood includes a front end seating on said shoulder flush with the front wall of the fuel tank first part to form a relatively smooth front for the vehicle.

* * * * *